March 25, 1969       D. B. MacDONALD       3,434,618
ELECTRICAL RECEPTACLE COVER Filed March 15, 1967                    Sheet 2 of 2

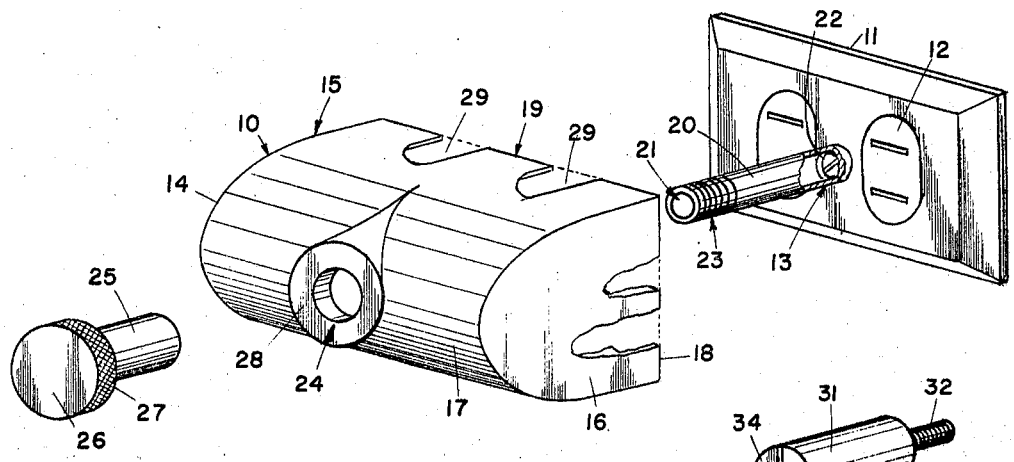
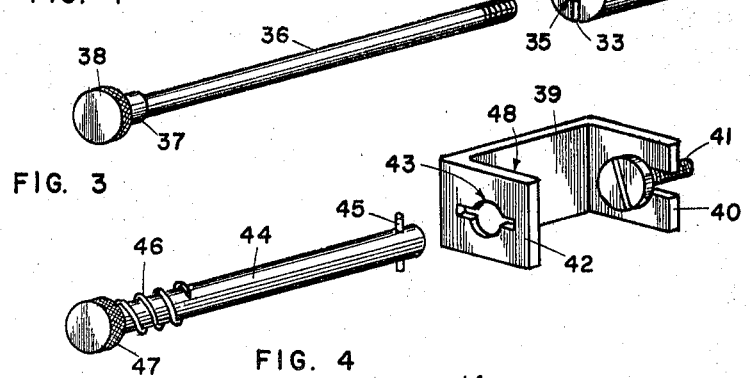
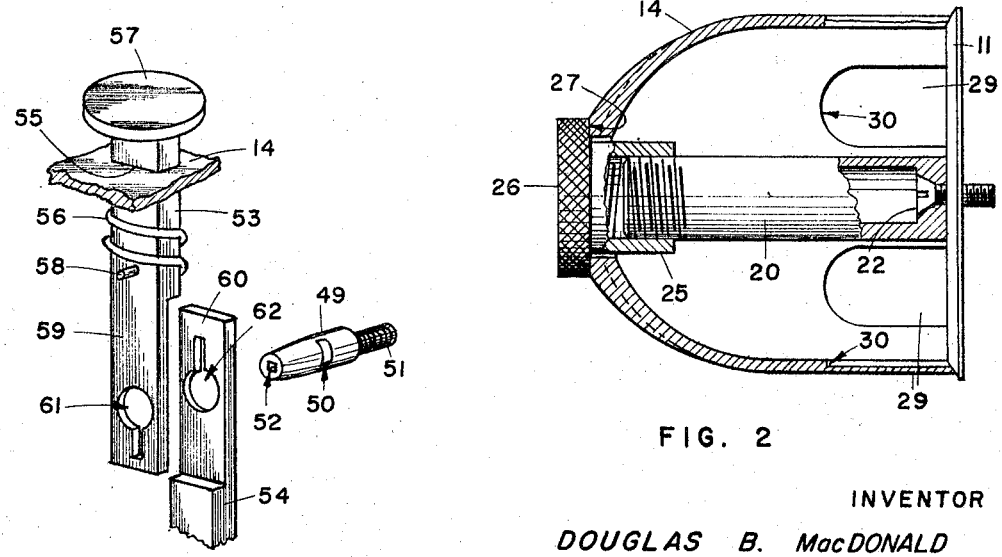

INVENTOR
DOUGLAS B. MacDONALD

BY *Cavanagh & Norman*
ATTORNEY

3,434,618
ELECTRICAL RECEPTACLE COVER
Douglas Blake MacDonald, 15 Helga Court,
Hamilton, Ontario, Canada
Filed Mar. 15, 1967, Ser. No. 623,395
Claims priority, application Canada, Mar. 18, 1966,
955,121
Int. Cl. B65d *51/00*, H05k *5/03*
U.S. Cl. 220—24.2                                 3 Claims

ABSTRACT OF THE DISCLOSURE

This invention discloses apparatus intended for use by householders for covering electrical receptacles while appliances may be plugged in and thus guard against children receiving shocks by playing with the cords. The device generally comprises a hollow cup-like cover member having a rim defining a rectangular opening for fitting about a receptacle cover plate; means for removably fastening said cover member to the receptacle by means of a single screw; and at least one knock-out portion in said cover member adjacent said rim, whereby removal of such portion will provide clearance for an electrical cord therethrough.

---

This invention relates to a safety cover for electrical outlets and the like.

The domestic hazards caused by electrical outlets at floor level is well known. Many proposals have been put forward for providing closed receptacles of various kinds in which the electrical outlet unit was modified in some way so as to be recessed within the wall or to provide a cover plate covering the contact openings when not in use. One example of an attempt to overcome this problem is shown in Canadian Letters Patent 644,330. Other examples are found in United States Letters Patent 2,439,708, 1,662,275 and 2,441,643. It will be noted that in each case the safety device proposed requires some greater or lesser modification of the existing electrical outlet or receptacle and in some cases complete modification of the installation and re-location of the receptacle within the wall of the building. While these devices may achieve, to a greater or lesser extent, a degree of increased safety as compared with the standard open electrical outlet, it is apparent that the market for such devices will be severly restricted since in the great majority of cases the considerably increased expense will be unacceptable to the householder.

It will further be appreciated that a reduction in domestic accidents will be achieved only if two conditions are met, namely, a device must be developed which has at least a certain limited degree of increased safety as compared with open outlets, and, this device must achieve the widest possible domestic sales. Obviously, no matter how effective a proposed device may be, if it fails to get into production and appear on shelves of hardware stores, it will not succeed in producing any reduction of accidents whatever. Conversely, a device of somewhat lesser effectiveness which achieves wide distribution will result in a certain reduction of domestic accidents notwithstanding its somewhat less efficient construction. It is clear that the principal factor involved in achieving mass distribution are the economy in production, and the adaptability of the device to existing standard electrical outlets by any householder with the aid of a screwdriver or the like.

Accordingly, it is an objective of the present invention to provide a cover for a standard electrical outlet which may be attached to the electrical outlet with a minimum of modification thereof and which is effective to prevent accidental removal of the electrical plugs from their sockets.

More particularly, it is an objective of the present invention to provide a cover device having the foregoing advantages which incorporates attachment means which are manually operable to release and replace the cover.

More particularly, it is an objective of the present invention to provide a cover device having the foregoing advantages which incorporates cover mounting means attachable to the existing base plate of the electrical outlet and provides means for releasably attaching the cover in position.

More particularly, it is an objective of the present invention to provide a cover device having the foregoing advantages in which the electrical cords may be led out at various selected openings.

More particularly, it is an objective of the present invention to provide a cover device having the foregoing advantages which is provided with releasable locking attachment means.

The foregoing and other advantages will become apparent from the following description of a preferred embodiment of the invention which is here given by way of example only with reference to the following drawings in which like reference devices refer to like parts thereof throughout the various views and diagrams, and in which:

FIGURE 1 is an exploded perspective illustration of the receptacle cover according to the invention partially cut-away to reveal the construction thereof and showing the mode of attachment to an electrical receptacle outlet of typical design;

FIGURE 2 is a section through the assembled receptacle cover shown in FIGURE 1;

FIGURE 3 is a perspective illustration of a further embodiment of the attachment means;

FIGURE 4 is a perspective illustration of a further embodiment of the attachment means;

FIGURE 5 is a further cut-away perspective illustration of the attachment means;

Figure 6:
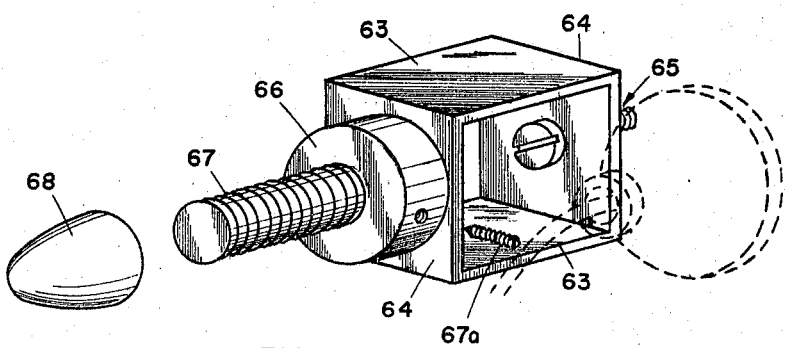
FIGURE 6 is an exploded perspective view of a further embodiment of attachment means.

With reference to FIGURE 1 a receptacle cover according to the invention is illustrated and indicated generally as 10. The cover 10 is adapted for fitting over a receptacle cover plate 11, this cover plate fitting over the receptacle of which only the face portions as at 12 are shown, this type of receptacle being one in wide use. As is conventional with such receptacles a single screw as at the position 13 is utilized in securing the cover plate 11 to the electrical receptacle.

The receptacle cover comprises a hollow cup-like cover member 14 provided with the end walls as at 15 and 16 and a wrap-around side wall 17. The walls 15, 16 and 17 define a rim 18 about the cover 10 which in turn defines a rectangular opening as at 19.

One means for securing the receptacle cover 10 to the receptacle 12 is shown in FIGURE 1 wherein a post 20 provided with a deep socket as at 21 is secured by means of the screw 22 to the receptacle 12, this screw position being the same as is used to secure the cover plate 11 to the receptacle. The barrel or post 20 is provided with external threads as at 23 and the barrel extends away from the face of the cover plate 11 to be in close proximity to the hole 24 in the receptacle cover 10. A barrel nut 25 preferably provided with the knurling as at 26 is internally threaded and adapted to thread over the threaded end of post 20 in order to engage the receptacle cover 10 adjacent the cover plate 11 thereby to cover the same. The rim as at 27 engages with the edge 28 of the hole 24 upon the barrel nut 25 being tightened over the post 20.

A number of knock-out portions such as at 29 are provided about the rim 18 and are of sufficient size when broken out to provide clearance for an electrical cord therethrough. Further details of the knock-out portion is shown in FIGURE 2 and from this it will be seen that the knock-out 29 is provided with a thinned section about the periphery thereof as at 30 whereby the required number of knock-outs can be removed from the receptacle cover to provide clearance for the electrical cords.

Other means for providing knock-outs can be resorted to and it is intended that the means shown are done so by way of example only. Thus, various types of punch-outs and break-outs can also be resorted to if so desired. It is intended that the terminology knock-out serve to refer to any such means as may be provided with the receptacle cover member and intended to be removed later to provide the openings as required.

With reference to FIGURE 3 a further embodiment of the means for securing the receptacle cover to the receptacle is illustrated. In this embodiment a post 31 is provided with a threaded end 32 which takes the place of the screw 22 as shown in FIGURE 1 and FIGURE 2, and is used for supporting the post 31 and for securing the receptacle plate 11 onto the receptacle. For convenience in securing the post 31 a screwdriver slot 33 is provided. The end 34 of the post 31 is also provided with the threaded hole as at 35 which is adapted to receive the screw 36 and secure the cover member 14 to the receptacle. It is preferable to provide an enlarged end as at 37 together with the thumb portion 38.

With reference to FIGURE 4 a still further embodiment of the means for securing the receptacle cover to a receptacle is illustrated where a U-shaped member 39 is shown provided with a slotted end as at 40 which fits over the head of the screw 41, the screw being placed in position as previously described. The remaining leg of the U-shaped member 39 as at 42 is provided with a keyed slot 43. A key 44 having a cross-pin 45 fitted therein is equipped with a spring member 46 towards the outward end thereof whereby upon the receptacle cover 14 being assembled onto a receptacle 12 the spring 46 acting against the enlarged collar 47 of key 44 will resiliently bias the pin 45 against the inner face as at 48 of the U-shaped member 39. It is considered that this type of attachment means would be for use with the receptacle cover where it is desired to have a cover which is quickly detachable.

Referring to FIGURE 5 a still further embodiment of the means for attaching the receptacle cover is shown which incorporates an additional safety feature. In this embodiment a barrel 49 is provided with a slot as at 50, the threaded end 51 serving the purpose of replacing screw 22 as shown in FIGURE 1 and FIGURE 2. As an aid to installing the barrel 49 a wrenching socket is provided as at 52. A pair of reciprocable members 53 and 54 are provided and are slidably mounted in the cover member as shown at 55. It will be understood that the member 54 is similarly mounted for reciprocable movement and other than being opposed to operate in an opposite direction is identical in configuration to the member 53.

Member 53 is biased to an upward or closed position by means of the spring 56 acting on the button 57. Upward movement of the member 53 is limited by the pin 58 acting on the inside of the cover member 14.

Each member 53 and 54 is provided with a flattened portion as at 59 and 60 respectively which define the slots 61 and 62 therein. The slots are provided with an enlarged portion and a portion of reduced dimension whereby upon the enlarged portion being in line the ends 59 and 60 can be fitted over the barrel 49 and upon the members 53 and 54 being released the respective spring member such as the spring member 56 will force the ends 59 and 60 apart thereby locking the barrel 49 by interaction of the reduced slots 61 and 62 with the peripheral slot 50 in barrel 49. By resort to this embodiment a locking device is achieved which is both quickly removable and at the same time is tamper-proof and thus not likely to be operable by very young children.

FIGURE 6 illustrates a further embodiment of cover attachment means for use where the outlet sockets are too close to one another to permit the use of the attachment means of FIGURES 1 and 3. This embodiment comprises a one-piece plastic member formed into rectangular shape and having side walls 63 and end walls 64. One of said end walls 64 is provided with a screw opening 65 for attachment to the receptacle and the other said end walls 64 is provided with an internally threaded collar 66 adjustably receiving tubular member 67 which is retained in locked position in grub screw 67a. Member 67 is exteriorly threaded for connection to internally threaded barrel nut 68. The length of end walls 64 is preferably arranged to be sufficient to define spacing therebetween adequate to accept overlapping of segments of electrical plugs therewithin (as shown in phantom). Adjustment of member 67 in collar 66 permits adaptation to various electrical installations.

Figure 7:
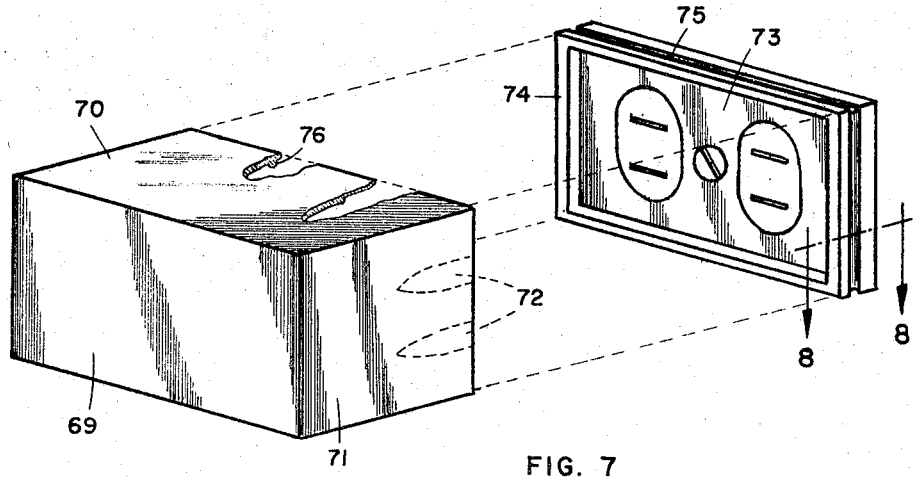
FIGURE 7 is an exploded perspective view of a further embodiment of the invention.
Figure 8:
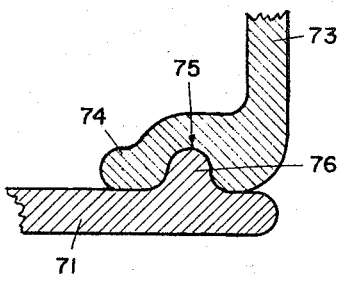
FIGURE 8 is an enlarged section along the line 8—8 of FIGURE 7.

FIGURES 7 and 8 illustrate a further embodiment wherein the attachment means is incorporated in the structure of the cover. This further embodiment comprises a cover member defined by front wall 69, side walls 70 and end walls 71. Knock outs 72 are provided around side and end walls 70 and 71 as above. In place of the standard receptacle face plate 11 (see FIGURE 1) a modified face plate 73 is provided having a peripheral wall member 74 therearound provided with a groove 75 therein which is adapted to mate with a corresponding rib 76 around the inner peripheries of side and end walls 70 and 71, as shown in FIGURE 8, thereby eliminating the separate attachment means.

In use, a receptacle cover according to the present invention can be provided having an opening defined by a rim which can be placed over an electrical receptacle after which the cover can be secured to the receptacle by means of a locking device as illustrated. By selecting one or more of the knock-out positions and removing this portion or portions clearance can be provided for the electrical cords leading to the plugs connected to the receptacle. The receptacle cover can be removed at any time as required in order to add or take an electrical plug therefrom.

From the foregoing it will be seen that the present invention provides a cover for electrical outlets wherein a hollow cup-like cover is provided for fitting over the outlet and means are provided for removably fastening the cover to the receptacle. In addition, at least one removable portion is provided whereby a clearance for an electrical cord can be selected therethrough.

What I claim is:

1. A receptacle cover for electrical outlets of the type having a cover plate secured to a receptacle by means of a single screw and comprising: a hollow cup-like cover member having a rim defining a rectangular opening for fitting about the receptacle cover plate; a plastic member of rectangular configuration securable to said outlet by means of said screw; an end wall including an internally threaded collar thereon located opposite to the point of attachment by said screw; a tubular member having an external thread and threadably adjustable within said internally threaded collar; locking means operative with said tubular member to lock it in position in said collar; and a cap nut fittable over said tubular member to secure said cover over said electrical outlet.

2. A cover as claimed in claim 1, wherein said locking means comprise a grub screw threadably engaged in said collar for locking engagement with said tubular member.

3. A receptacle cover for electrical outlets of the type having a cover plate secured to a receptacle by means of a single screw and comprising; a receptacle cover plate of rectangular configuration and having an upstanding peripheral rim; a hollow cup-like cover member having a rim defining a rectangular opening for fitting about the receptacle cover plate; a rib or groove on said upstanding cover plate rim and a cooperating groove or rib respectively on the inner periphery of the cover member rim cooperatively engageable by snap fitting with the rib or groove respectively of the cover plate upon the rim of the cover member being pushed into engagement with the periphery of the cover plate and fastening the said cover member to the cover plate; and at least one knock-out portion in said cover member adjacent said rim, whereby removal of such portion will provide clearance for an electrical cord therethrough.

References Cited
UNITED STATES PATENTS
2,415,602   2/1947   Monaco _____ 174—48

JAMES B. MARBERT, *Primary Examiner.*

U.S. Cl. X.R.

174—67